United States Patent
Chee et al.

(10) Patent No.: US 6,545,846 B1
(45) Date of Patent: Apr. 8, 2003

(54) PIEZOELECTRIC CONTROLLED MECHANISM FOR MINUTE MOVEMENT OF A MAGNETIC HEAD

(76) Inventors: Wonshik Chee, 3200 N. Cramer St. University of Milwaukee, Mech. Eng. Dept., Milwaukee, WI (US) 53211; Haesung Kwon, 75 W. Plumeria Dr., San Jose, CA (US) 95134; Pyongwon Yim, 1196 W. McKinley Ave., Sunnyvale, CA (US) 94086

( * ) Notice: Subject to any disclaimer, the term of this patent is extended or adjusted under 35 U.S.C. 154(b) by 0 days.

(21) Appl. No.: 09/540,247

(22) Filed: Mar. 31, 2000

(51) Int. Cl.$^7$ .................................................. G11B 5/56
(52) U.S. Cl. ..................................................... 360/294.4
(58) Field of Search ....................................... 360/294.4

(56) References Cited

U.S. PATENT DOCUMENTS

| 5,189,578 | A | | 2/1993 | Mori et al. |
| 5,282,190 | A | | 1/1994 | Maruo et al. |
| 5,745,319 | A | * | 4/1998 | Takekado et al. |
| 5,757,573 | A | | 5/1998 | Tokuyama et al. |
| 5,764,444 | A | | 6/1998 | Imamura et al. |
| 5,802,914 | A | * | 9/1998 | Fassler et al. |
| 5,867,347 | A | | 2/1999 | Knight et al. |
| 5,943,189 | A | | 8/1999 | Boutaghou et al. |
| 6,188,548 | B1 | * | 2/2001 | Khan et al. ............... 360/294.4 |
| 6,246,552 | B1 | * | 6/2001 | Soeno et al. ............. 360/294.4 |
| 6,268,983 | B1 | * | 7/2001 | Imada et al. ............. 360/294.4 |
| 6,362,933 | B1 | * | 3/2002 | Sampietro et al. |

FOREIGN PATENT DOCUMENTS

JP          05-189732     *    7/1993

* cited by examiner

Primary Examiner—Craig A. Renner
(74) Attorney, Agent, or Firm—Gregory Smith & Associates; Jeffrey P. Aiello

(57) ABSTRACT

The present invention is a mechanism for making minute adjustments in the position of a read/write head for magnetically or optically reading from or writing to a data storage media. The head positioning mechanism (microactuator) will preferably be used in association with known disk storage actuation systems such as those typically used in current magnetic data storage devices such as hard disk drives, and optical data storage devices such as CDs. The microactuator comprises a slider support arm with a slider formed thereon, that is separated from an anchor structure by a gap. A pizoelectric element is positioned across the gap and is coupled at one end to the slider support arm, and at the other to the anchor structure. The anchor structure has greater resistance to bending than the slider support arm. Thus, when the piezoelectric element changes length, the slider support arm will tend to bend relative to the anchor structure, moving the slider on the slider support arm a controlled minute distance.

13 Claims, 4 Drawing Sheets

PIEZOELECTRIC CONTROLLED MECHANISM FOR MINUTE MOVEMENT OF A MAGNETIC HEAD

FIELD OF THE INVENTION

This invention relates to a mechanism for minute movement of a head capable of reading and or writing data, and more particularly to a head moving mechanism for making minute adjustments in the position of a head for magnetically or optically reading from or writing to a data storage media comprising one or more rotating disks.

DESCRIPTION OF THE PRIOR ART

Data storage devices employing one or more rotating disks with one or more surfaces on each disk useable for storing digital data are well known. Such data storage devices are often referred to as disk drives. Disk drives provide a relatively low cost means for randomly storing and accessing data. Typically, each data storage surface is divided into a number of concentric circular data tracks. Each data track is typically further divided into a number of data track locations or sectors capable of storing information. Generally, data is written or accessed by positioning a read/write magnetic head held by a head suspension for supporting the head over a selected data track while the disk is rotating. The read/write head can then read or write data to or from track sectors located on that data track. The read/write head is typically biased against the surface of the disk such that, as the disk rotates, the read/write head "flies" on an air bearing above the disk.

A typical suspension system in a hard disk drive includes a voice coil motor configured for rotating the actuator arm over the desired location on the disk by rotating an actuator arm around an axis on a support spindle. A head suspension or load beam is coupled to the end of the actuator arm, and frequently, a flexure is coupled to the end of the load beam and carries the read/write head. This type of suspension is typically used in both magnetic and non-magnetic disks.

As efforts to continue to increase track density, the radial spacing between concentric data tracks on the disks decreases. As the density increases, it is increasingly difficult for known motor servo systems to quickly and precisely position the read/write head over a desired data track. Current conventional actuator-motors, such as voice coil motors, lack sufficient resolution to effectively accommodate current high track density disks. This problem is complicated by the increased susceptibility of such drives to sources of read/write errors. For example, errors can arise when the read/write head and the data tracks are offset due to a difference in coefficient of thermal expansion between respective component parts when there occurs a temperature difference between the points of time of writing and reading data. A similar offset takes place due to uneven temperature distribution during operation. These problems have necessitated the addition of a high resolution head microactuator to the conventional head positioning apparatus.

Various microactuator designs have been proposed to accomplish high resolution head positioning, including pizoelectric, electromagnetic, electrostatic, capacitive, fluidic, and thermal actuators. However, previous microactuators have not been fully successful because the proposed solutions either do not provide sufficient resolution or accuracy, or the solutions are complicated and expensive to manufacture.

What is needed is a microactuator that is relatively simple and inexpensive to fabricate, and that is capable of quickly and accurately positioning a head over a desired data track.

SUMMARY OF THE INVENTION

Accordingly, the current invention is a head positioning assembly or microactuator that is lightweight, inexpensive to manufacture, and that provides the desired resolution or track positioning accuracy. The microactuator of the invention comprises a slider support arm with a slider positioned on the slider support arm to read from or write to a data medium. An anchor structure is spaced apart from the slider support arm to define a gap separating the slider support arm and the anchor structure. A piezoelectric element is coupled at one end to the slider support arm, and at the other end to the anchor structure, with the middle portion of the piezoelectric element extending across the gap separating the slider support arm and the anchor structure.

The head positioning assembly of the invention is preferably formed as an integral structure by cutting a gap in the distal end of the load beam (the end furthest from the servo motor) to separate the slider support arm and the anchor structure. However, in alternate embodiments, the microactuator may comprise separate elements that are coupled to the load beam, or the microactuator may be coupled to or formed on a flexure coupled to the load beam. In some embodiments, the slider support arm may include a means for reducing the vertical motion of the slider support arm in a direction approximately perpendicular to the surface of the data storage medium.

In a preferred embodiment, the piezoelectric element is affixed to the slider support arm and to the anchor structure by a resin adhesive. Any piezoelectric element may be useable in the invention, however, a multi-layered or laminate PZT (lead zirconate titanate) piezoelectric element is preferred.

Conductors are placed in electrical contact with the piezoelectric element so that a voltage differential between the conductors will cause a change in geometry of the piezoelectric element. The piezoelectric material is fabricated and positioned, as is well known, so that a voltage differential of a selected polarity will cause a geometric change in configuration of the piezoelectric element causing the piezoelectric element to lengthen. A voltage differential of a reverse polarity will cause an opposite shortening of the piezoelectric element. The change in length of the piezoelectric element causes the slider support arm to move relative to anchor structure, allowing the fine control of the position of the slider over a selected data track.

In the preferred embodiment the flexible slider support arm is bent by the movement of the piezoelectric element in order to position the slider. However, in alternate embodiments one or more hinge structures may be formed on or coupled to the slider support arm so that the slider support arm will tend to bend or pivot only at the hinge structure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE INVENTION

The present invention is a mechanism for making minute adjustments in the position of a head for magnetically or optically reading from or writing to a data storage media. The head positioning mechanism (hereafter "microactuator 20") will preferably be used in association with known disk storage actuation systems such as those typically used in current magnetic data storage devices such as hard disk drives, and optical data storage devices such as CDs. Although it is preferred to use the invention on disk shaped data storage mediums, the invention may also be used in other kinds of data storage devices. The invention will be discussed in more detail with reference to FIGS. 1 though 7, wherein like numbers refer to like elements.

Figure 1:
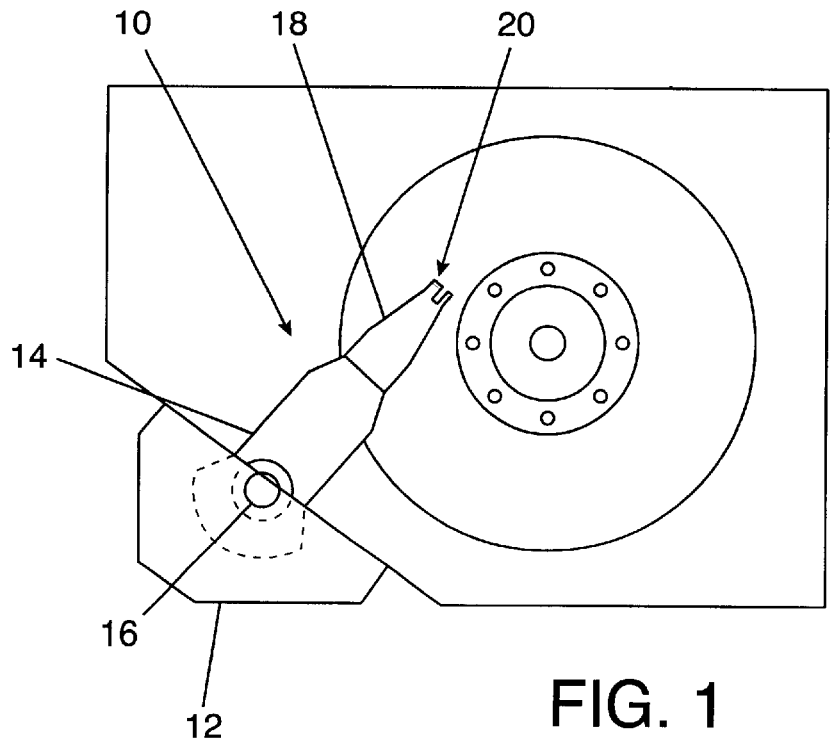
FIG. 1 shows a top plan view of a typical hard disk drive incorporating an embodiment of the microactuator of the invention.

FIG. 1 shows a generic hard disk drive actuation system 10 including the microactuator 20 of the invention. The generic actuation system 10 comprises a voice coil motor 12 configured to rotate an actuator arm 14 around an axis on the support spindle 16. A head suspension or load beam 18 is coupled to the end of the actuator arm 14. The configuration of the generic disk drive actuation system 10 is not critical to the invention, and the microactuator 20 of the invention may be used in many different known actuation system configurations.

Figure 2:
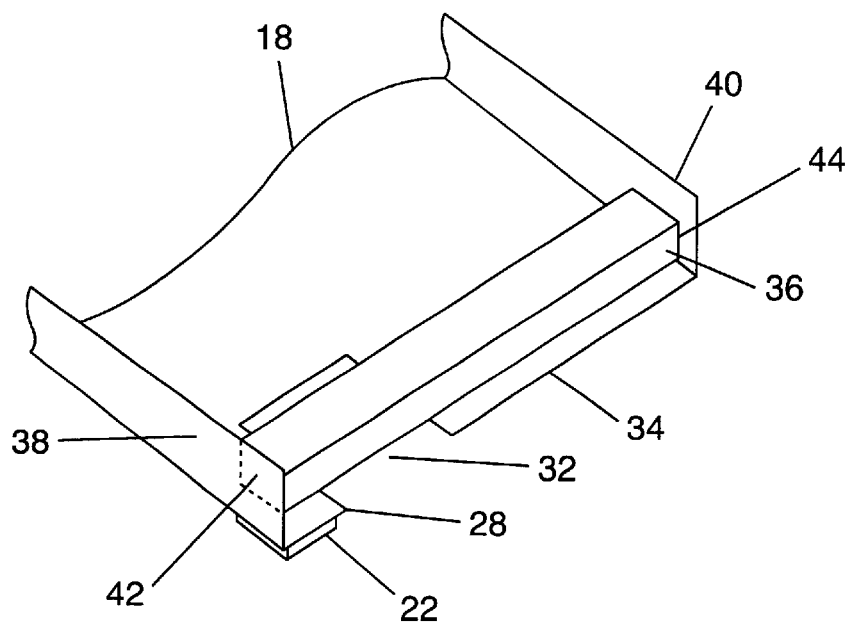
FIG. 2 shows a perspective view of a first embodiment of the invention.

FIG. 2 is a perspective view of a first embodiment of the microactuator 20 of the invention formed on the distal end (end furthest form the servo motor) of the load beam 18. The microactuator 20 comprises a slider arm 28 separated by a gap 32 from an anchor structure 34. A pizoelectric element 36 is coupled at or near a first end 42 to the slider support arm 28, extends across the gap 32, and is coupled at or near a second end 44 to the anchor structure 34. The slider 22 is preferably positioned near the distal end of the slider support arm 28 as shown in FIG. 2, but in alternate embodiments could be positioned differently.

One of the advantages of the microactuator 20 of the invention is that in the preferred embodiment, only a single piezoelectric element 36 is used. However, in alternate embodiments several piezoelectric elements 36 may be used. The piezoelectric material is fabricated and positioned, as is well known, so that a voltage differential of a selected polarity will cause a geometric change in configuration of the piezoelectric element, causing the piezoelectric element to lengthen. A voltage differential of a reverse polarity will cause an opposite shortening of the piezoelectric element.

The piezoelectric element 36 may be fabricated from any practical piezoelectric material or materials. The piezoelectric element 36 may be formed from a single material, or may be a multi-layered or laminate structure. In any case, the preferred piezoelectric element 36 will provide a long stroke while requiring a low voltage to effect the change. A piezoelectric element 36 formed by laminating PZT (lead zirconate titanate) is a common and inexpensive piezoelectric material, that may be acceptable for use in the invention. The precise requirements will vary depending on a number of engineering considerations, including the desired attainable resolution, however, it is preferable that the piezoelectric element 36 selected will provide a 0.1 to 0.3 micro-inch stroke with 4–6 volts. Furthermore, although a piezoelectric element 36 is preferred, any element capable of expansions and contraction responsive to received electromagnetic signals may be useable (e.g. a magnetic strain element) in place of the piezoelectric element 36.

The piezoelectric element 36 is preferably bonded to the load beam 18 with a known resin adhesive, although any acceptable means for bonding the piezoelectric element 36 to the load beam 18 may be used.

In the preferred embodiment of the microactuator 20 shown in FIGS. 2 through 8, the position and configuration of the gap 32 may play an important role in functioning of the microactuator 20. The gap 32 severs the distal end of the load beam 18 into separate regions of unequal size and or stiffness. In FIGS. 1–8, the slider support 28 arm is narrower than the anchor structure 34. Because of the relative difference in size, the slider support arm 28 can be considered flexible when compared to the anchor structure 34. When the piezoelectric element 36 changes length, the anchor structure 34 will tend to have greater resistance to deformation or bending than the slider support arm 28. Thus, the slider support arm 28 will tend to bend relative to the anchor structure 34. This causes the slider 22 on the slider support arm 28 to move in a transverse direction across the surface of the data disk, allowing selective positioning of the slider 22 over desired data tracks. In alternate embodiments including a hinge structure on the slider support arm 28, as will be discussed further below, the size differential between the slider support arm 28 and the anchor structure 34 may be reduced or even reversed.

The increased flexibility of the slider support arm 28 may allow undesirable vertical motion relative to the surface of the disk, which may be overcome by the side addition of a side rail 38 to the slider support arm 28. The side rail 38 will tend to resist the vertical flexing of the slider support arm 28. A second side rail 40 may also be included on the anchor structure 34. The vertical side rail 38 of the slider support arm 28 may not significantly interfere with the transverse motion of the slider support arm 28 as the planer direction of the side rail 38 is approximately perpendicular to the transverse motion of the slider support arm 28.

Figure 3:
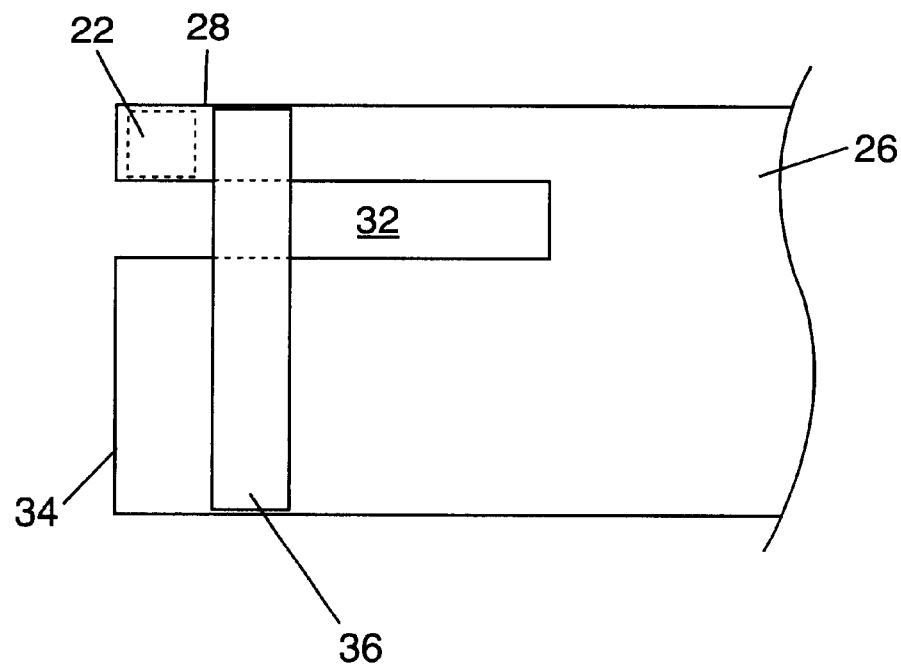
FIG. 3 shows a top view of the embodiment of the microactuator of FIG. 2.
Figure 4:
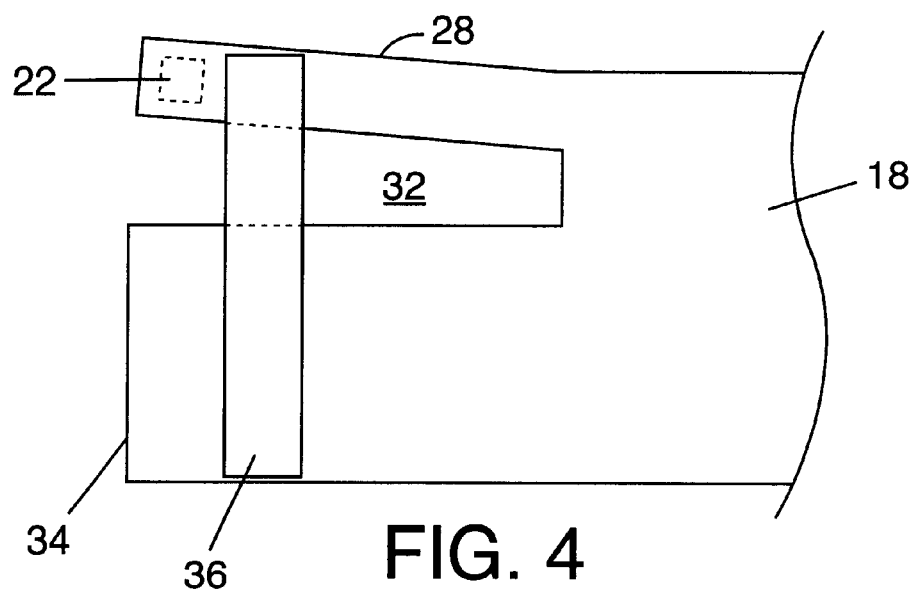
FIG. 4 shows the piezoelectric element lengthened from its neutral condition, causing the slider support arm to bend in a first direction.
Figure 5:
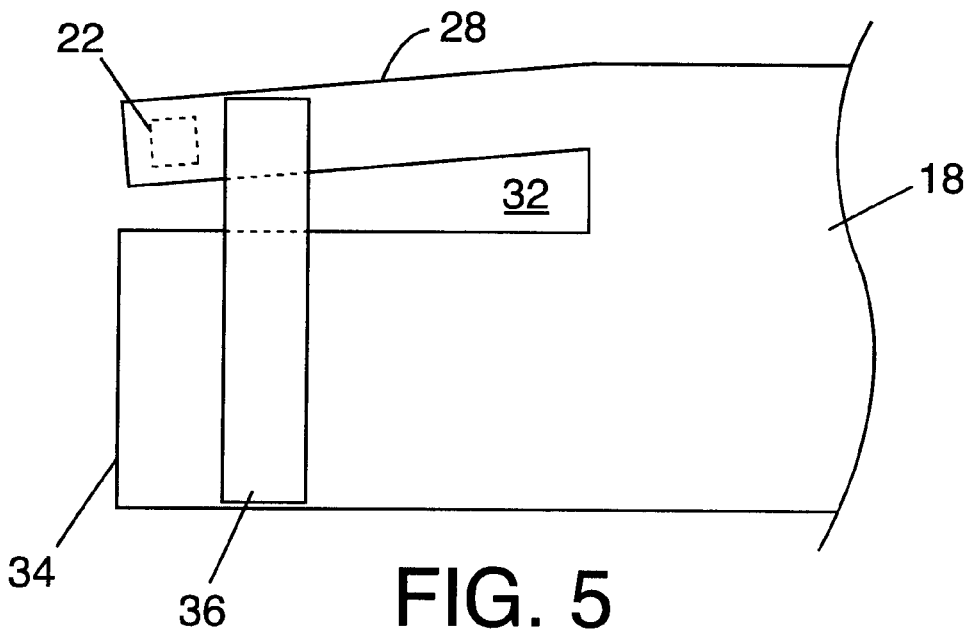
FIG. 5 shows the piezoelectric element shortened from its neutral condition, causing the slider support arm to bend in a second direction.

The piezoelectric element 36 will include known contacts or conductors (not shown) preferably affixed to or near the ends 42 and 44 of the piezoelectric element 36 to allow the application of an electric charge to the piezoelectric element 36. When there is no voltage difference between conductors, the pizoelectric element 36 is in its neutral position (neither lengthened or shortened), as shown in FIG. 3, which is a top view of the embodiment of the microactuator 20 seen in FIG. 2. When a voltage differential of a selected polarity is applied to the piezoelectric element 36, piezoelectric element 36 will lengthen. The change in length of the piezoelectric element 36 causes the slider support arm 18 to move in a first direction relative to anchor structure 34, as seen in FIG. 4 (exaggerated). A voltage differential of a reverse polarity will cause an opposite shortening of the piezoelectric element 36. The change in length of the piezoelectric element 36 causes the slider support arm 18 to move in a second direction relative to anchor structure 34, as seen in FIG. 5 (exaggerated). The magnitude of the movement may be controlled by controlling the magnitude of the voltage differential across the piezoelectric element 36.

The head positioning mechanism of the invention has been described in a configuration formed on the distal end of the load beam 18, however, in alternate embodiments the microactuator could be formed at different locations on the load beam 18. The microactuator disclosed in FIGS. 1, 2, 4, and 5 show the microactuator formed by making a gap in the load beam 18. However, in alternate embodiments, the microactuator may comprise separate elements coupled to the load beam 18. For example, the slider support arm 28 may be a separate component from the anchor structure 34, and the gap 32 is created by positioning the slider support arm 28 and the anchor structure 34 a selected distance apart. Furthermore, the size, depth, and shape of the gap 32 may be varied in alternate embodiments.

Figure 8:
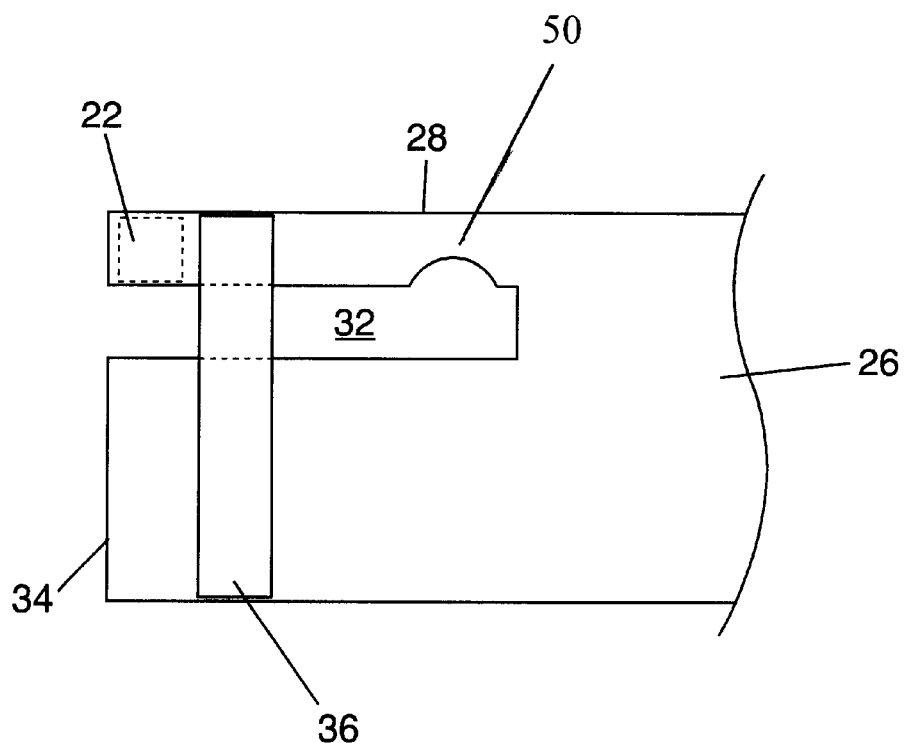
FIG. 8 shows a top view of an embodiment of the microactuator including a hinge structure formed on the slider support arm.

In the preferred embodiment the slider support arm 18 is bent by the movement of the piezoelectric element 36 in order to position the slider 22. However, in alternate embodiments one or more hinge structures may be coupled to the slider support arm 18 so that the slider support arm 18 will tend to bend or pivot only at the hinge structure. Many known hinge structures may be useable in the present invention. The hinge structure may be formed integrally with the slider support arm 18. For example, the hinge structure may be an area of reduced resistance to deformation formed integrally on the slider support arm 18, so that the slider support arm tends to bend at the hinge structure. In other embodiments, the hinge structure may be a separate structure. FIG. 8 shows an alternate embodiment including a hinge portion 50, which in this embodiment comprises a narrowed or more flexible region at which the slider support arm 28 will preferentially bend. Many other configurations are well known, and any acceptable hinge structure 50 may be used.

Figure 6:
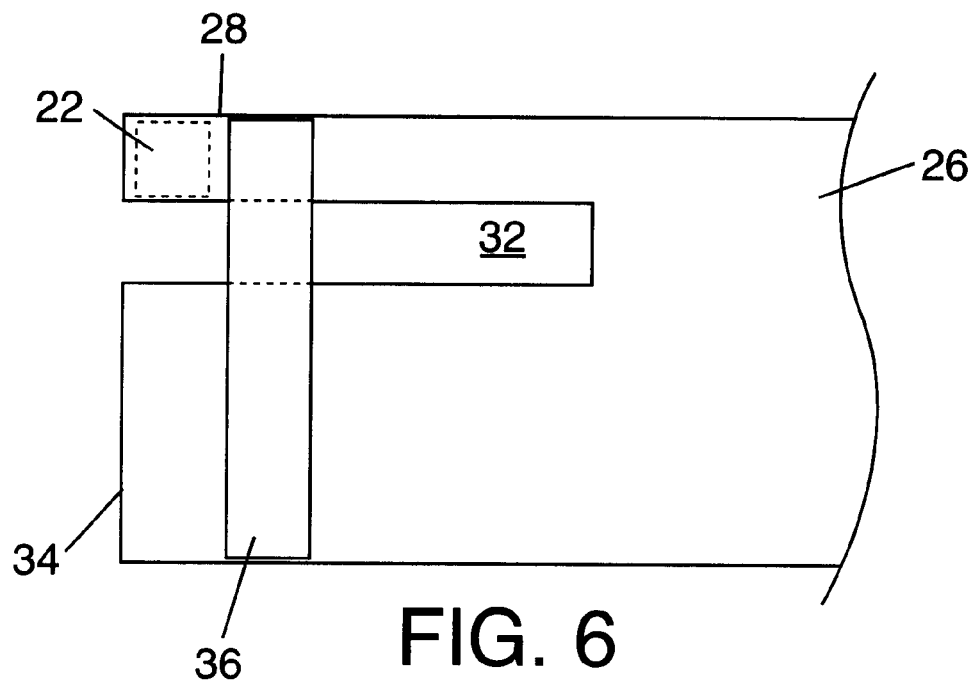
FIG. 6 shows a top view of an embodiment of the microactuator of the invention formed-in the distal end of a flexure.
Figure 7:
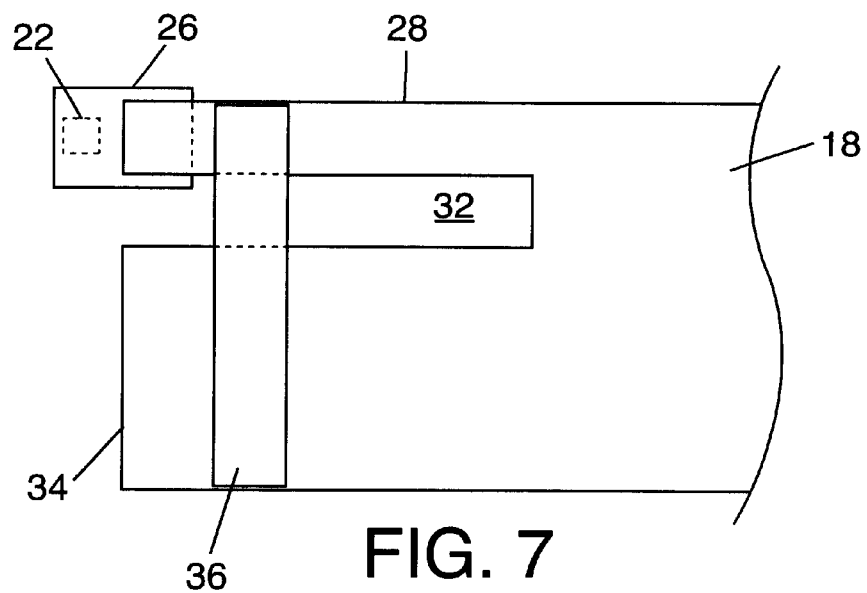
FIG. 7 shows a top view of the embodiment of the microactuator of the invention formed in the distal end of the load beam, but with a flexure holding the slider and coupled to the end of the slider support arm.

In alternate embodiments, the microactuator 20 of the invention may be used in many other actuation arm assembly configurations. For example, FIG. 6 shows an alternate embodiment of the microactuator 20, wherein the microactuator 20 is formed on a flexure 26 coupled to the distal end of the load beam 18. FIG. 7 shows an alternate embodiment wherein the flexure 26 carries the slider, and the flexure 26 is coupled to the slider support arm 28 of the microactuator 20.

In operation, the actuation arm assembly 10 is moved by known means over selected tracks on the surface of the disk. However, for a variety of reasons, including the increasing smaller track widths, a higher resolution than has been available using known actuation arm positioning means is required. The actuation arm assembly 10 places the read/write head on the slider 22 as close as possible to the desired track. Then, the microactuator 20 of the invention allows minor adjustments to the position of the slider 22 to be made by regulating the voltage difference across the piezoelectric element 36, thereby bending of the slider support arm 18, allowing minute adjustment to the position of the slider 22.

To those skilled in the art, many changes and modifications will be readily apparent from consideration of the foregoing description of preferred embodiments without departure from the spirit of the present invention; the scope thereof being more particularly pointed out by the following claims. The description and disclosures provided are by way of illustration only and should not be construed as limiting the scope of the present invention which is more particularly pointed out by the following claims.

What is claimed is:

1. A head positioning assembly comprising:
   a slider support arm with a slider coupled thereto, said slider support arm extending along a first axis,
   an anchor structure spaced apart from said slider support arm to define a gap separating said slider support arm and said anchor structure, said gap extending along an axis approximately parallel to said axis of said slider support arm, and
   a piezoelectric element having a length, a first end, and a second end, said piezoelectric element being coupled at said first end to said slider support arm, said second end being coupled to said anchor structure, and a portion of said piezoelectric element between said first and second ends of said piezoelectric element extending along an axis approximately perpendicular to said axis of said slider support arm across said gap separating said slider support arm and said anchor structure.

2. The head positioning assembly of claim 1, wherein the head positioning assembly is positioned on a flexure.

3. The head positioning assembly of claim 1, wherein said piezoelectric element is a laminated PZT piezoelectric element.

4. The head positioning assembly of claim 1, wherein said piezoelectric element receives a voltage differential to cause a change in geometry of said piezoelectric element.

5. The head positioning assembly of claim 4, wherein said piezoelectric element elongates or shortens, from a neutral condition, along said axis of said piezoelectric element.

6. The head positioning assembly of claim 5, wherein said change in geometry of said piezoelectric element causes the slider support arm to move relative to said anchor structure.

7. The head positioning assembly of claim 1, wherein said slider support arm includes a means for reducing vertical motion of said slider support arm in a direction approximately perpendicular to a surface of a data storage medium.

8. The head positioning assembly if claim 1, wherein said slider support arm defines a plane, and wherein said slider support arm further comprises a flange extending in a plane approximately perpendicular to said plane of said slider support arm.

9. The head positioning assembly of claim 8, wherein said anchor structure defines a plane, and wherein said anchor structure further comprises a flange extending in a plane approximately perpendicular to said plane of said anchor structure.

10. The head positioning assembly of claim 9, wherein said first end of said piezoelectric element abuts said flange of said slider support arm, and wherein said second end of said piezoelectric element abuts said flange of said anchor structure.

11. A head positioning assembly comprising:
    a slider support arm defining a plane and comprising a flange extending in a plane approximately perpendicular to said plane of said slider support arm for inhibiting a vertical component of vibration motion experienced by said slider support arm,
    an anchor structure spaced apart from the slider support arm to define a gap separating the slider support arm and the anchor structure,
    a piezoelectric element having a length, a first end and a second end, the piezoelectric element being coupled at the first end to the slider support arm, the second end being coupled to the anchor structure, and a portion of the piezoelectric element between the first and second ends of the piezoelectric element extending across the gap separating the slider support arm and the anchor structure, wherein at least a portion of said flange is located at a region bent upon actuation of said piezoelectric element.

12. The head positioning assembly of claim 11, wherein said anchor structure defines a plane and wherein said anchor structure further comprises a flange extending in a plane approximately perpendicular to said plane of said anchor structure.

13. The head positioning assembly of claim 12, wherein said first end of said piezoelectric element abuts said flange of said slider support arm, and wherein said second end of said piezoelectric element abuts said flange of said anchor structure.

* * * * *